United States Patent
Oh et al.

(10) Patent No.: US 10,928,575 B2
(45) Date of Patent: Feb. 23, 2021

(54) BEVELED LIGHT GUIDE PLATE

(71) Applicant: Dell Products L.P., Round Rock, TX (US)

(72) Inventors: Guentaek Oh, Singapore (SG); Kyung Eun Lee, Singapore (SG); Yong Gu Kang, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/459,949

(22) Filed: Jul. 2, 2019

(65) Prior Publication Data

US 2021/0003761 A1    Jan. 7, 2021

(51) Int. Cl.
*G02F 1/1333* (2006.01)
*F21V 8/00* (2006.01)

(52) U.S. Cl.
CPC ........... *G02B 6/002* (2013.01); *G02B 6/0016* (2013.01); *G02B 6/0036* (2013.01); *G02B 6/0065* (2013.01); *G02F 1/133308* (2013.01); *G02F 2001/133325* (2013.01)

(58) Field of Classification Search
CPC ................................................. G02F 1/133308
See application file for complete search history.

(56) References Cited

U.S. PATENT DOCUMENTS

| | | | | |
|---|---|---|---|---|
| 6,219,116 B1* | 4/2001 | Yuuki | ............... | G02F 1/133308 349/58 |
| 2003/0201702 A1* | 10/2003 | Kim | ................... | G02F 1/133615 313/110 |
| 2011/0090142 A1* | 4/2011 | You | ....................... | G02B 6/0043 345/102 |
| 2012/0230050 A1* | 9/2012 | Kim | ..................... | G02B 6/0018 362/602 |
| 2014/0340931 A1* | 11/2014 | Nishitani | ............. | G02B 6/0028 362/609 |
| 2017/0031087 A1* | 2/2017 | Jeon | ....................... | G02B 6/0025 |
| 2017/0192291 A1 | 7/2017 | Shi | | |

FOREIGN PATENT DOCUMENTS

| | | | |
|---|---|---|---|
| EP | 1548359 A1 | 6/2005 | |
| EP | 2081062 B1 | 2/2012 | |
| EP | 3185066 A1 | 6/2017 | |

\* cited by examiner

*Primary Examiner* — Edmond C Lau
(74) *Attorney, Agent, or Firm* — Zagorin Cave LLP; Robert W. Holland

(57) ABSTRACT

A display couples a display panel over a light guide plate in a sharp edge housing by adapting the light guide plate side to have a beveled surface that fits along its perimeter into a reduced depth of the housing. The light guide plate beveled surface has angled sides relative to the light guide plate illumination side and reflective side to fit against parallel sides formed in the housing as the housing narrows towards its base where the light guide plate couples. A diffusive pattern formed in the light guide plate reflective surface that directs light towards the illumination surface extends onto the light guide plate side beveled surface.

19 Claims, 3 Drawing Sheets

BEVELED LIGHT GUIDE PLATE

BACKGROUND OF THE INVENTION

Field of the Invention

The present invention relates in general to the field of information handling system displays, and more particularly to an information handling system display having a beveled light guide plate.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include processing components that cooperate to process information, such as a central processing unit (CPU) interfaced with a memory. Generally, information handling system output is presented as visual images at a display. Often end users interact with the processing components through graphical user interfaces presented at the display, such as with a keyboard, mouse and/or touchscreen. Typically end users prefer to have larger display areas that can more readily present information for consumption, such as with separate windows. Often to enhance visual information presentation, end users will interface multiple display devices with an information handling system. This allows an end user, for instance, to simultaneously have windows open that present a web browser, email application and word processing application, as well as other output. Larger viewing areas tend to increase end user efficiency as the end user is able to present information for ready access rather than searching for minimized content when needed.

One common type of display for presenting visual images is the liquid crystal display (LCD). An LCD generates visual images with an array of pixels disposed to provide a defined image resolution, such as High Definition (1920×1080) or Ultra High Definition (4096×2160). Each pixel includes a red, green and blue liquid crystal element that filters different amounts of light based upon the state of liquid crystal material in the element. Generally, a timing controller (TCO) in the display accepts pixel values from a graphics processor of an information handling system and scans the pixel values across the array of pixels by setting a voltage to adjust the liquid crystal state of each pixel element. The combined red, green and blue light that passes through the pixels create a color seen by the end user so that all of the pixels taken as a whole define a visual image.

Generally, LCDs provide light at the backside of an LCD panel to pass through the pixels and generate the visual image with red, green and blue light filtered by the liquid crystal elements. Backlights typically include a light that generates illumination, a light guide plate that distributes the illumination and filters that direct the illumination towards the LCD panel. For instance, the light is often a series of light emitting diodes (LEDs) disposed in a linear configuration on a flexible printed circuit board that couples to the light guide plate. The light guide plate receives the illumination and, through reflective surfaces and openings, distributes the illumination evenly across the back of the LCD panel.

In a desktop environment, end users generally want large display screen areas, yet minimalistic display housing thickness, i.e., a slim edge about the display perimeter. For instance, an end user viewing visual images across two display areas typically prefers viewing the visual information of each screen without large bezel areas around the presented information. Slim edge displays are easier to move around when needed, such as when sharing presented information with other users or placing two displays in close proximity to compare presented information. One difficulty with conventional backlights is that the backlight increases the size and thickness of the display. Generally, the backlight has a rectangular shape at its perimeter to ensure that illumination extends evenly across the back of the display. Typically, a bezel couples to the front of the display perimeter to hide the structure that holds the display in place.

SUMMARY OF THE INVENTION

Therefore, a need has arisen for a system and method which provides a beveled light guide plate integrated behind a display panel.

In accordance with the present invention, a system and method are provided which substantially reduce the disadvantages and problems associated with previous methods and systems for providing backlight to a display. A display couples to a housing over a light guide plate having a beveled side surface that fits against a sloped wall of the housing as the housing narrows from a support arm that holds the display towards a base that supports the light guide plate.

More specifically, an information handling system processes information with a processor and memory for presentation at a display as visual images. The display defines the visual images at a display panel having an array of liquid crystal pixels that filter red, green and blue light passed through the display panel by a backlight. The backlight has a reflective side that couples to a base of a housing at a first perimeter and an illumination side disposed proximate the display panel having a second perimeter larger than the first perimeter so that the light guide plate side surfaces are beveled off of a perpendicular axis between the reflective and illumination sides. The housing forms a sharp edge that tapers from where the display panel couples to where the reflective side couples at the base. The housing has a parallel side surface to the beveled light guide plate surface so that the light guide plate fits into the housing as the housing narrows towards the base. A microscopic diffusive pattern formed in the reflective side extends up the light guide plate beveled surface to direct light towards the illumination side.

The present invention provides a number of important technical advantages. One example of an important technical advantage is that a display backlight beveled perimeter fits more efficiently in the display housing to reduce display thickness by defining a slim edge about the display perimeter. Aligning the light guide plate beveled portion with a substantially sloped support surface of a support arm that holds the display panel in place helps to ensure a minimum thickness of the support arm of at least 1 mm while still allowing a slim edge at the display perimeter. Reduced assembly complexity provides a sharp edge around the perimeter to support a slim and narrow bezel around the perimeter front, or even a zero edge perimeter without a bezel. Slight adjustments to light guide plate reflective elements within the light guide plate ensure even distribution of light for high quality image presentation. Minimized gap between the light guide plate, the supporting mechanical structure and the display panel provides a sleek and thin display without extending the display perimeter and increasing the bezel size.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system display supports a sharp edge with a slim perimeter by including a beveled side surface in a light guide plate disposed behind the display panel and against a display housing support arm. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
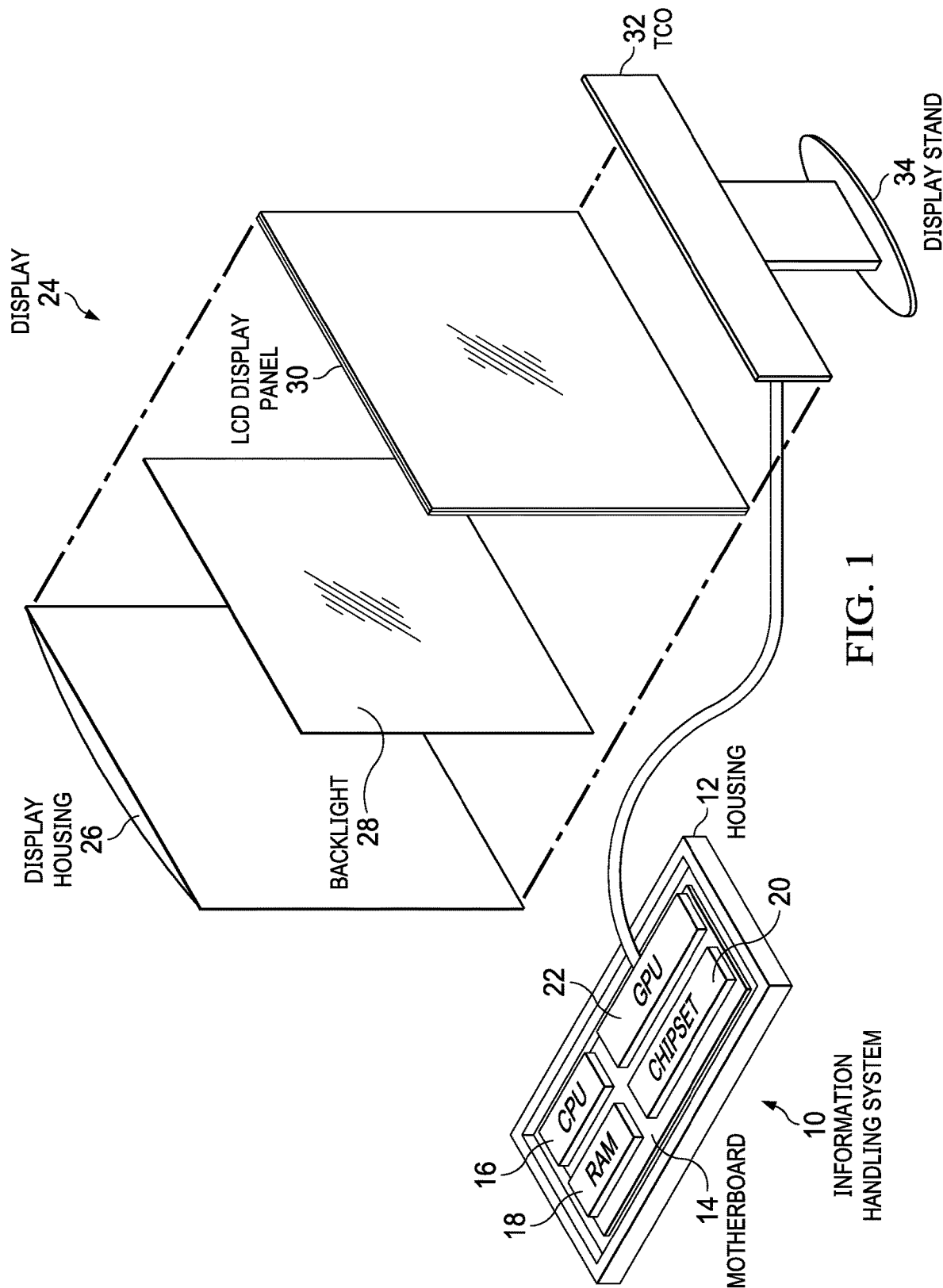
FIG. 1 depicts an exploded view of an information handling system coupled to a display to present information as visual images.

Referring now to FIG. 1, an exploded view depicts an information handling system 10 coupled to a display 24 to present information as visual images. In the example embodiment, information handling system 10 has a desktop configuration with a housing 12 separate from display 24. Housing 12 contains a motherboard 14 supporting communication between processing components that cooperate to process information. For example, a central processing unit (CPU) 16 executes instructions to process information in cooperation with a random access memory (RAM) 18 that stores the information. A chipset 20 coordinates operation of CPU 16, including communication with a graphics processing unit (GPU) 22 that further processes the information to define the visual image. For instance, GPU 22 defines an array of pixel values that define colors presented at display 24 and communicates the pixel values to display 24, such as through a display cable. Although the example embodiment depicts a desktop configuration, in alternative embodiments alternative types of configurations may be used, such as a portable, convertible, laptop or tablet information handling system configurations.

Display 24 defines the visual image by applying the pixel values to an array of pixels disposed across the surface of a liquid crystal display (LCD) panel 30. For instance, each pixel includes liquid crystal elements that filter red, green blue light with a crystal state set by an applied voltage. The visual image is created by passing illumination from a backlight 28 at the rear of LCD panel 30 through LCD panel 30 so that the light is filtered by the liquid crystals. LCD panel 30 couples over backlight 28 into a display housing 26 so that backlight 28 aligns properly under LCD panel 30 to illuminate evenly across the surface of LCD panel 30. In the example embodiment, a timing controller (TCO) 32 and display stand 34 couple to display housing 26 to hold the display in a viewing position. TCO 32 scans pixel values to LCD panel 30 and manages other system functions.

Figure 2:
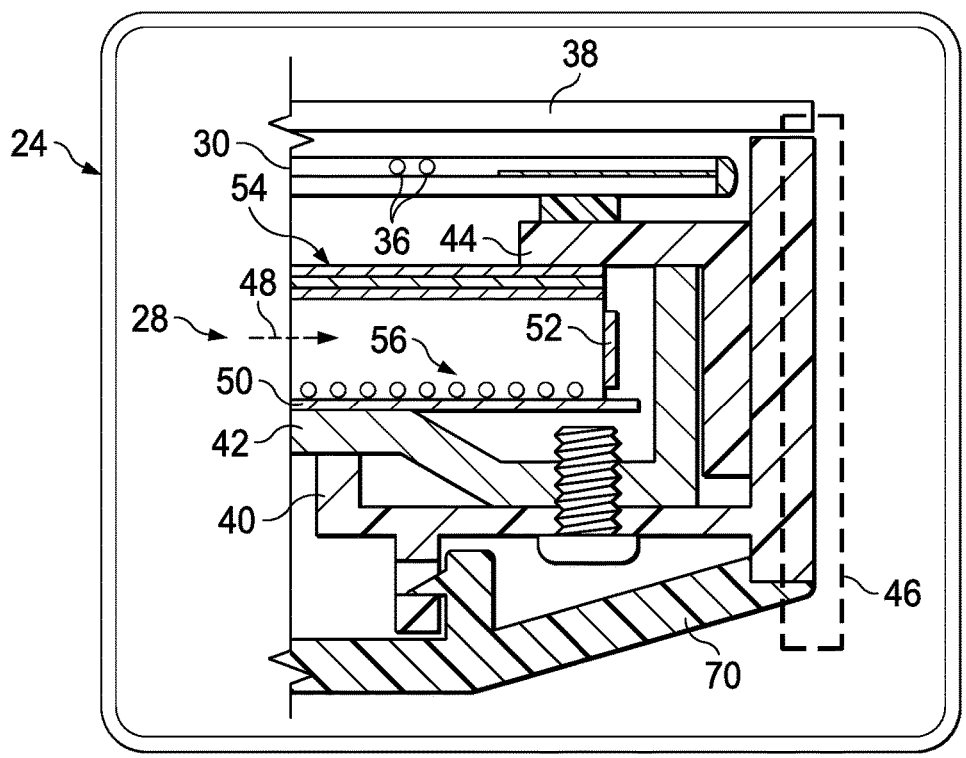
FIG. 2 depicts a side cutaway view of a prior art display having a flat edge light guide plate.

Referring now to FIG. 2, a side cutaway view depicts a prior art display 24 having a flat edge 46 light guide plate 48. LCD panel 30 pixels 36 are held above a light guide plate 48 of a backlight 28 in a parallel disposition so that illumination is provided from backlight 28 through pixels 36 and out a cover glass 38 placed over LCD panel 30. In alternative embodiments, LCD panel 30 may bond to light guide plate 48 and/or cover glass 38 may be omitted. To maintain LCD panel 30 and light guide plate 48 in a parallel disposition, a cover bottom 42, such as a pressed metal part, supports light guide plate 48 against middle frame 40, such as a plastic part. A guide panel 44 couples between cover bottom 42 and middle frame 40 to provide a support for LCD panel 30. Light guide plate 48 has a flat edge that is held in place by a flat edge 46 formed by the assembly of cover bottom 42 and middle frame 40. A rear cover 70 couples to the backside of middle frame 40, such as a plastic part. Light guide plate 48 at the lower surface has a reflector 50 to redirect illumination into light guide plate 48 and an optical film 54 to evenly distribute illumination towards LCD panel 30. A side reflector 52 located at flat edge 46 reflects illumination back into light guide plate 48. A microscopic diffusion pattern 56 is formed in the bottom surface of light guide plate 48 to aid in redirection of illumination towards LCD panel 30. The perpendicular relationship of the top surface of light guide plate 48 and flat edge 46 tends to increase the thickness of display 24 at the edge 46 perimeter of display 24.

Figure 3:
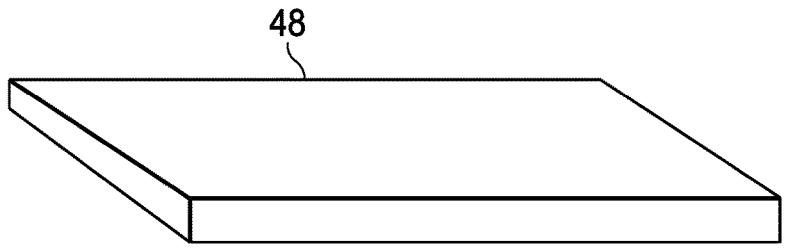
FIG. 3 depicts a perspective view of a prior art light guide plate having a side perimeter with flat edges.

Referring now to FIG. 3, a perspective view depicts a prior art light guide plate 48 having a side perimeter with flat edges. Light guide plate 48 has a rectangular prism shape with perpendicular intersections at non-parallel sides. An upper illumination side provides light to a display panel and a lower reflective side reflects light upwards towards the display panel, such as with a microscopic diffusion pattern formed in the bottom surface of light guide plate 48. The illumination upper side and reflective lower side have a parallel relationship with a perimeter formed by four sides, each perpendicular to the illumination and reflective sides. As a result, both the illumination sides and reflective side have substantially the same perimeter size.

Figure 4:
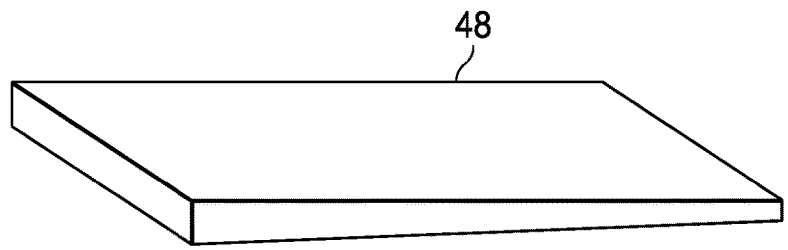
FIG. 4 depicts a perspective view of a prior art light guide plate having a wedge shape and a side perimeter with flat edges.

Referring now to FIG. 4, a perspective view depicts a prior art light guide plate 48 having a wedge shape and a side perimeter with flat edges. The upper illumination side of light guide plate 48 is held parallel to the display panel while the lower reflective side slopes at an angle relative to the upper illumination side. The angle of the reflective side aids in assembly with a display that has reduced thickness around the display panel perimeter. However, all of the side surfaces proceeding between the illumination and reflective sides have a perpendicular relationship with the illumination side. One difficulty with the wedge shape light guide plate is that manufacture typically requires an injection molding process. In contrast, manufacture of the rectangular prism light guide plate 48 depicted in FIG. 3 may also be supported by protrusion with chamfer cutting, which tends to cost less.

Figure 5:
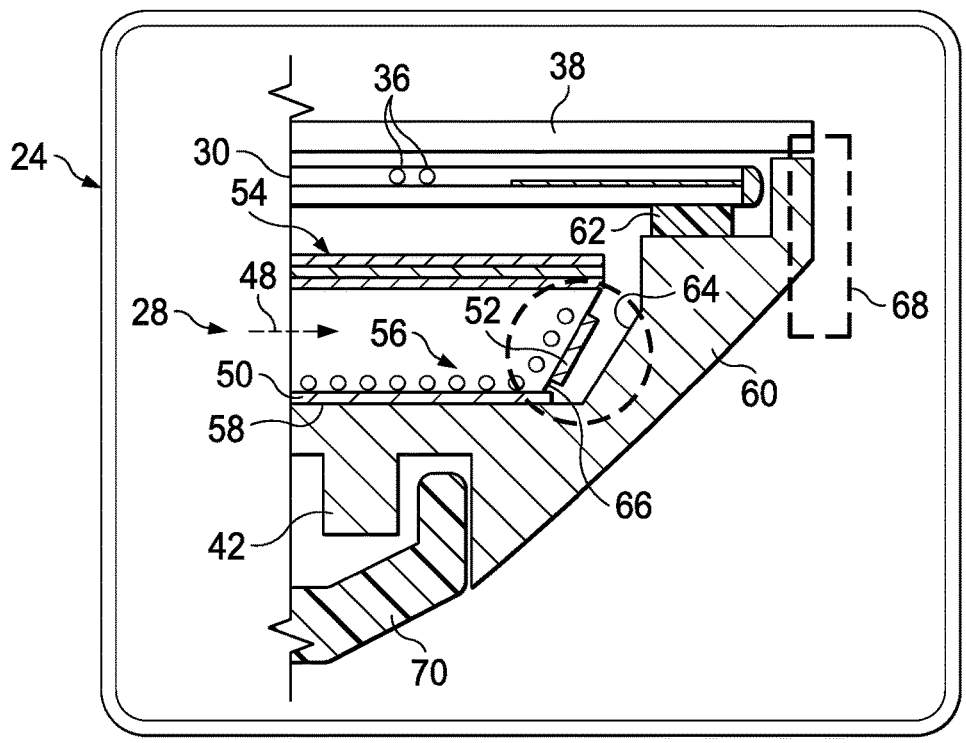
FIG. 5 depicts a side cutaway view of a display having a beveled light guide plate.

Referring now to FIG. 5, a side cutaway view depicts a display 24 having a beveled light guide plate 48. Display 24 cover bottom 42 acts as a housing that supports assembly of a light guide plate 48 and LCD panel 30 with a sharp edge 68 having a reduced thickness around the perimeter of display 24. Cover bottom 42 is a contiguous body, such as made of cast metal, that defines a base 58 having a perimeter that matches the perimeter of light guide plate 48 bottom reflective side and a support arm 60 that extends up and outward from base 58 to a display support 62 on which LCD panel 30 rests. At the interior of cover bottom 42 an angled surface 64 is formed from base 58 up along support arm 60 towards display support 62 to provide room for accepting light guide plate 48 at a beveled surface 66. The upper illumination side of light guide plate 48 at optical film 54 has a greater perimeter size than does the lower reflective side of light guide plate 48 at reflector 50 with the illumination and reflective sides having a parallel relationship. Microscopic diffusion pattern 56 formed on the reflective side of light guide plate 48 extends up the surface of beveled surface 66 to aid in reflection of illumination to the illumination side at optical film 54. A side reflector 52 is disposed below diffusion pattern 56 to reflect illumination back into light guide plate 48 that does not interact with the diffusion pattern 56.

Display 24 assembles with backlight 28 coupled to base 58 within an interior of cover bottom 42. The perimeter of base 58 substantially matches the perimeter of the reflective side of light guide plate 48 to hold backlight 28 in a desired alignment with LCD panel 30. Angled surface 64 aligns substantially parallel with beveled surface 66 to provide additional support where the perimeter of both light guide plate 48 and the interior of cover bottom 42 increase as support arm 60 extends upward and away from base 58 to display support 62. Display panel 30 assembles over backlight 28 by resting on display support 62, which aligns the area of display 30 having pixels 36 to receive illumination passing from light guide plate 48 through optical film 54. In the example embodiment, a glass cover 38 fits over LCD panel 30, although alternative embodiments may omit glass cover 38. Cover bottom 42 couples to rear cover 70 to complete the assembly. Light guide plate 48 beveled side surface 66 helps to support a sharp edge 68 form factor of display 24 with a reduced thickness at the display perimeter that tapers down towards base 58. The substantially parallel alignment of support arm 60 and light guide plate 48 beveled surface 66 helps to ensure a minimum thickness of support arm 60, such as 1 mm.

Figure 6:
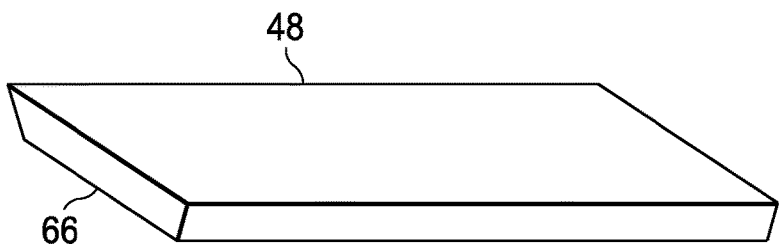
FIG. 6 depicts a perspective view of a light guide plate having a perimeter with beveled edges.

Referring now to FIG. 6, a perspective view depicts a light guide plate 48 having a perimeter with beveled edges. In the example embodiment, light guide plate 48 has a perimeter of the upper illumination side that is greater than the perimeter of the lower reflective side to from a trapezoidal prism that fits within the interior of cover bottom 42. The reflective and illumination sides have a parallel orientation to cooperatively direct illumination towards an LCD panel proximate the illumination side. The larger perimeter of the illumination side is sized to fit under the perimeter of the LCD panel to ensure even distribution of illumination across the LCD panel viewing area. The smaller perimeter of the reflective side is sized to fit within the perimeter of the cover bottom base. Beveled surfaces 66 angle inward from the illumination side towards the reflective side to match the angled surface of the cover bottom at support arm 60. Advantageously, light guide plate 48 may be manufactured with a protrusion process and chamfer cutting, which tends to reduce costs relative to manufacture by injection molding.

In various embodiments, various angular relationships may exist for the sides of light guide plate 48 relative to the illumination and reflective sides. For instance, a sharp edge form factor for a display typically involves the upper horizontal and two vertical sides so that light guide plate 48 may have a flat edge along the bottom side. Alternatively, only one side of the perimeter may have the beveled side surface, such as the upper side, while the other three sides have flat edges with a perpendicular relationship. In the example embodiment, the beveled surfaces intersect at the illumination side with an angle of less than 90 degrees, such as a range of 30 to 60 degrees as needed to support the angle surface of the housing interior into which light guide plate 48 is intended to fit. For instance, the example embodiment depicted in FIG. 5 has substantially a forty-five degree intersection between the illumination side and beveled side. In the example embodiment, all of light guide plate 48 sides that bevel have the same angular intersection relationship, however, in alternative embodiments irregular angular relationships may be formed to support various housing configurations, such as different intersection angles along different sides of light guide plate 48 at the intersection with the illumination side.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to execute instructions to process information;
   a memory interfaced with the processor and operable to store the instructions and information;
   a graphics processor operable to process the information to define visual images for presentation;

a display panel interfaced with the graphics processor and operable to generate the visual image at a front surface;

a backlight disposed at a rear surface of the display panel to provide illumination to the display panel, the backlight having a light guide plate, the light guide plate having an illumination side proximate the display panel to provide illumination to the display panel, a reflective side distal the display panel providing reflected light towards the illumination side, and a perimeter having at least one beveled side extending from the illumination side inward towards the reflective side; and a display housing having a base with a first perimeter and support arm extending up from the base to define a beveled exterior terminating at a sharp edge exterior defining a second perimeter of greater than the first perimeter, the beveled exterior and sharp edge exposed as the outer surface of the housing, the sharp edge defining an interior area to support the display panel, the backlight perimeter beveled side disposed in the housing below the display panel at the display housing support arm to provide a fit of the backlight in the housing with the housing interior having the beveled side at the support arm.

2. The information handling system of claim 1 wherein the display panel comprises a liquid crystal display panel having plural liquid crystal pixels.

3. The information handling system of claim 1 wherein the housing is formed as a die cast part.

4. The information handling system of claim 1 further comprising a diffusing surface treatment at the light guide plate at least one beveled side to diffuse light impacting the light guide plate at least one beveled side.

5. The information handling system of claim 1 wherein the light guide plate at least one beveled side forms substantially a forty-five degree angle at an intersection with the illumination side.

6. The information handling system of claim 1 wherein the light guide plate at least one beveled side forms substantially a sixty degree angle at an intersection with the illumination side.

7. The information handling system of claim 1 wherein the light guide plate at least one beveled side forms substantially a thirty degree angle at an intersection with the illumination side.

8. The information handling system of claim 1 further comprising:
a diffusive pattern formed in the reflective side to reflect light towards the illumination side; and
the diffusive pattern extending onto the light guide plate at least one beveled side.

9. A method for assembly of a display, the method comprising:
forming a housing having a base with a base perimeter and a support member with a support member perimeter larger than the base perimeter, the support member extending out from the base to define a cavity and a beveled exterior from the base to the support member, the beveled exterior exposed as the exterior surface of the display;

forming a light guide plate having a reflective side sized to fit in the base perimeter, an illumination side having a perimeter larger than the base perimeter, and a beveled side surface extending between the reflective side and the illumination side; and coupling the light guide plate reflective surface to the base to have the light guide plate beveled side surface disposed proximate the beveled exterior.

10. The method of claim 9 further comprising:
forming a display support in the support member opposite the base; and
coupling a display panel to the display support over the illumination side.

11. The method of claim 10 further comprising:
defining the beveled surface in the support arm interior having a parallel relationship with the light guide plate beveled side surface; and
coupling the light guide plate to align the light guide plate beveled side with the support arm beveled surface.

12. The method of claim 11 wherein the display panel comprises a liquid crystal display panel.

13. The method of claim 12 further comprising:
extending a diffusive pattern from the light guide plate reflective surface across the light guide plate beveled side surface.

14. The method of claim 12 wherein the light guide plate beveled side surface intersects the reflective surface at substantially a forty-five degree angle.

15. A display comprising:
a housing having a base with a base perimeter and a support member with a support member perimeter larger than the base perimeter, the support member extending out from the base to define a beveled exterior and a cavity having a beveled interior;

a light guide plate having a reflective side sized to fit in the base perimeter and coupled to the base, an illumination side having a perimeter larger than the base perimeter, and a beveled side surface extending between the reflective side and the illumination side; and a display panel coupled to the housing proximate the light guide plate illumination side;

wherein the housing support member beveled exterior is exposed as an exterior side surface of the display.

16. The display of claim 15 wherein the housing support member defines a surface parallel the light guide plate beveled side surface proximate the base.

17. The display of claim 16 wherein the display panel comprises a liquid crystal display panel.

18. The display of claim 17 further comprising a diffusive pattern formed in the light guide plate reflective side and extending into the beveled side surface.

19. The display of claim 18 wherein the light guide plate beveled side surface intersects the illumination surface at substantially thirty degrees.

* * * * *